United States Patent Office 3,428,640
Patented Feb. 18, 1969

3,428,640
METHOD OF PREPARING PYRIDINES
Everett A. Mailey, Norristown, Pa., assignor to Pennsalt Chemicals Corporation, Philadelphia, Pa., a corporation of Pennsylvania
No Drawing. Filed Oct. 11, 1965, Ser. No. 494,916
U.S. Cl. 260—290    13 Claims
Int. Cl. C07d 31/02

ABSTRACT OF THE DISCLOSURE

A lower alkylene oxide is reacted with a lower trialkyl amine in the presence of a metal oxide catalyst at 350–500° C. to produce a composition comprising a mixture of pyridine and pyridine related compounds.

---

This invention relates to an organic base composition comprising pyridine and pyridine bases. More particularly it relates to a catalytic process wherein a lower trialkylamine is reacted with a lower alkylene oxide to produce an organic base composition containing pyridine, mixed picolines and other pyridine-related compounds.

Preparation of pyridine and other heterocyclic compounds from ammonia and olefin oxides, e.g., ethylene oxide and propylene oxide, over $Al_2O_3$ at 400–450° C. is taught by Malinovski, Ukrain, Khim. Zhur., 16, No. 3, 351–7 (1950); Chemical Abstracts, 48, 11415. Also, it is known that trimethylamine reacts with ethylene oxide in the presence of water to form choline,

$((CH_3)_3NCH_2CH_2OH)OH$.

It has now been found that a lower trialkylamine, preferably trimethylamine, can be reacted with a lower alkylene oxide, preferably ethylene oxide, by passing a mixture of the gaseous materials at about 350°–500° C., preferably about 400° C., over a metal oxide catalyst, preferably synthetic silica-alumina catalyst, in a quartz reaction tube at a space velocity of about 10–40 volumes, preferably about 15, per minute per volume of catalyst.

The feed materials are converted to yield about 25% of mixed heterocyclic products. The product composition when freed of reactants consists essentially of alpha picoline, beta picoline, gamma picoline, pyridine and other pyridine-related compounds. The composition can be separated into its components by fractional distillation. However, the composition preferably is used in its unseparated form as an organic base for neutralizing acid, e.g., HCl, gases from organic chemical processes. The spent mixture can be regenerated for reuse as an organic base by treatment with an inorganic base, e.g. sodium hydroxide.

The lower alkylene oxide used in practice of the invention can be ethylene oxide, propylene oxides, including propylene oxide and isopropylene oxide or butylene oxides, including butylene oxide, sec-isobutylene oxide and tert-isobutylene oxide.

The lower trialkylamine can be trimethylamine, triethylamine, tri-n-propylamine, tri-n-butylamine, tri-isobutylamine, N,N-dimethylethylamine, N,N,-dimethyl-n-propylamine, N,N-dimethylisopropylamine, N,N-dimethyl-n-butylamine N,N-dimethyl-sec-butylamine, N,N-dimethyltert-butylamine, N,N-dimethylisobutylamine, N,N-diethyl - n - propylamine, N,N - diethylisopropylamine, N,N-diethyl - n - butylamine, N,N-diethyl-sec-butylamine, N,N-diethyl - tert-butylamine, N,N-diethylisobutylamine, N,N-dimethylcyclohexylamine and N,N-diethylcyclohexylamine.

The catalyst preferably is a synthetic silica-alumina catalyst, e.g., Houdry catalyst S–46. However, other metal oxide catalysts can be used, for example, $Al_2O_3$, $SiO_2$, $Cr_2O_3$, $MoO_3$ or $V_2O_5$.

The invention can be further understood from the following example:

Trimethylamine and ethylene oxide were interacted at 400° C. at a space velocity of 14.3 ml. of gas per minute per ml. of catalyst. The catalyst (Houdry synthetic silica-alumina S–46) was activated by heating at 400° C. for 18 hours in the presence of nitrogen. The trimethylamine (136 ml./min.) and ethylene oxide (149 ml./min.) were fed into the heated zone at a mole ratio of 1.0:1.1, respectively. The effluent gases were quenched in two successive traps (a) at 0° C. and (b) at −80° C. Trap (a) was then purged with nitrogen at 25° C. overnight. The resulting liquid layers were treated independently with sodium hydroxide. The organic materials were separated and dried with caustic pellets. The products in the dried composition were identified by boiling points, odor, refractive index, infra-red spectrum, neutralization equivalent, spot tests and solubilities. The conversion of trimethylamine to other products was about 25%. The composition was found to contain about 55% mixed alpha-, beta- and gamma-picolines; about 1% pyridine, and about 44% of other pyridine-related compounds.

I claim:
1. A process for preparing a composition comprising alpha-, beta- and gamma-picolines, pyridine and pyridine-related compounds which comprises reatcing a lower alkylene oxide selected from the group consisting of ethylene oxide, propylene oxide and butylene oxides with a lower trialkylamine over a metal oxide catalyst selected from the group consisting of synthetic silica-alumina, $Al_2O_3$, $SiO_2$, $Cr_2O_3$, $MoO_3$ and $V_2O_5$ at a temperature in the range of 350–500° C. at a space velocity of about 10–40 volumes of the mixture of alkylene oxide and and trialkyl amine per minute per volume of the catalyst.
2. The process according to claim 1 wherein the lower alkylene oxide is ethylene oxide.
3. The process according to claim 1 wherein the lower alkylene oxide is propylene oxide.
4. The process according to claim 1 wherein the lower trialkylamine is trimethylamine.
5. The process according to claim 1 wherein the lower trialkylamine is triethylamine.
6. The process according to claim 1 wherein the lower trialkylamine is tri-n-propylamine.
7. The process according to claim 1 wherein the lower trialkylamine is tri-n-butylamine.
8. The process according to claim 1 wherein the lower trialkylamine is N,N-dimethylethylamine.
9. The process according to claim 1 wherein the metal oxide catalyst is synthetic silica-alumina.
10. The process according to claim 1 wherein the metal oxide catalyst is $SiO_2$.
11. The proces according to claim 1 wherein the metal oxide catalyst is $Al_2O_3$.
12. The process according to claim 1 wherein the temperature is about 400° C.

13. The process according to claim 1 wherein the space velocity is about 15 volumes of the mixture of the mixture of alkylene oxide and trialkyl amine per minute per volume of the catalyst.

References Cited

UNITED STATES PATENTS 2,744,903   5/1956   Boettner _____ 260—290

OTHER REFERENCES

Klingsberg, Pyridine and Its Derivs. (Interscience, N.Y., 1960), I: 477–8.

Malinovski, Epoxides and Derivs. (Davey, N.Y., 1965), pp. 232–4. (Effective date of Russian edition is 1961.)

HENRY R. JILES, *Primary Examiner.*

C. M. SHURKO, *Assistant Examiner.*